US011381147B2

(12) United States Patent
Moto et al.

(10) Patent No.: US 11,381,147 B2
(45) Date of Patent: Jul. 5, 2022

(54) DRIVING MECHANISM

(71) Applicant: TDK TAIWAN CORP., Yangmei Taoyuan (TW)

(72) Inventors: Ichitai Moto, Yangmei Taoyuan (TW); Shih-Ting Huang, Yangmei Taoyuan (TW); Haruo Taguchi, Yangmei Taoyuan (TW); Sin-Jhong Song, Yangmei Taoyuan (TW)

(73) Assignee: TDK TAIWAN CORP., Yangmei Taoyuan (TW)

(*) Notice: Subject to any disclaimer, the term of this patent is extended or adjusted under 35 U.S.C. 154(b) by 182 days.

(21) Appl. No.: 15/895,498

(22) Filed: Feb. 13, 2018

(65) Prior Publication Data

US 2018/0234004 A1 Aug. 16, 2018

Related U.S. Application Data

(60) Provisional application No. 62/459,712, filed on Feb. 16, 2017.

(30) Foreign Application Priority Data

Jan. 26, 2018 (CN) .......................... 201810077150.0

(51) Int. Cl.
*G02B 27/64* (2006.01)
*G02B 7/09* (2021.01)
(Continued)

(52) U.S. Cl.
CPC ............ *H02K 41/0356* (2013.01); *G02B 7/08* (2013.01); *G02B 7/09* (2013.01); *G02B 27/646* (2013.01);
(Continued)

(58) Field of Classification Search
CPC ............ H02K 41/0354; H02K 41/0356; H02K 11/215; G02B 7/08; G02B 7/00;
(Continued)

(56) References Cited

U.S. PATENT DOCUMENTS

| 2008/0100152 A1* | 5/2008 | Busch ..................... E05F 15/60 310/14 |
| 2014/0355120 A1* | 12/2014 | Yeo ....................... G02B 27/646 359/557 |
| 2015/0348688 A1* | 12/2015 | Yanagisawa .............. H01F 5/02 335/297 |
| 2016/0178922 A1* | 6/2016 | Hu ........................ G02B 27/646 359/557 |

(Continued)

FOREIGN PATENT DOCUMENTS

CN 101726852 A 6/2010
CN 103901701 A 7/2014
(Continued)

OTHER PUBLICATIONS

Office Action with Search Report dated Jun. 28, 2021 for the corresponding Application No. 201810077150.0 in China.

*Primary Examiner* — Ephrem Z Mebrahtu
(74) *Attorney, Agent, or Firm* — Muncy, Geissler, Olds & Lowe, P.C.

(57) ABSTRACT

A driving mechanism for driving an optical element is provided, including a holder unit, a base unit, and a magnetic element. The holder unit is used to hold the optical element, and the base unit includes a metal substrate and a circuit structure formed on the metal substrate, wherein the circuit structure includes a driving coil. The magnetic element is disposed on the holder unit and corresponds to the driving coil for driving the optical element to move relative to the base unit.

20 Claims, 13 Drawing Sheets

(51) Int. Cl.
*H02K 11/215* (2016.01)
*H02K 41/035* (2006.01)
*G02B 7/08* (2021.01)

(52) U.S. Cl.
CPC ....... *H02K 11/215* (2016.01); *H02K 2213/03* (2013.01)

(58) Field of Classification Search
CPC .. G02B 27/64; H04N 5/2257; H04N 5/23248; H04N 5/23212; H04N 5/23251; H04N 5/23287; H04N 5/2254; H04N 5/2253; G03B 2205/00; G03B 2205/0007; G03B 2205/0053; G03B 2205/0069; G03B 5/00; G03B 5/02; G03B 5/04; G03B 5/06; G03B 13/36
See application file for complete search history.

(56) References Cited

U.S. PATENT DOCUMENTS

| | | | |
|---|---|---|---|
| 2016/0241787 A1* | 8/2016 | Sekimoto | H04N 5/23212 |
| 2017/0054883 A1* | 2/2017 | Sharma | H04N 5/2253 |
| 2017/0082827 A1* | 3/2017 | Park | H04N 5/2251 |
| 2017/0134624 A1* | 5/2017 | Zhang | H04N 5/2257 |
| 2019/0058832 A1* | 2/2019 | Huang | H04N 5/23212 |
| 2019/0170967 A1* | 6/2019 | Jung | H04N 5/2251 |
| 2019/0204531 A1* | 7/2019 | Sugawara | G03B 5/06 |
| 2021/0294067 A1* | 9/2021 | Park | G02B 7/09 |

FOREIGN PATENT DOCUMENTS

| | | |
|---|---|---|
| CN | 205211518 U | 5/2016 |
| CN | 105988174 A | 10/2016 |
| CN | 106066524 A | 11/2016 |
| CN | 106067939 A | 11/2016 |
| TW | I457693 B | 10/2014 |

* cited by examiner

DRIVING MECHANISM

CROSS REFERENCE TO RELATED APPLICATIONS

This Application claims priority claims priority of provisional U.S. Patent Application Ser. No. 62/459,712 filed Feb. 16, 2017 and China Patent Application No. 201810077150.0 filed on Jan. 26, 2018, the entirety of which is incorporated by reference herein.

BACKGROUND OF THE DISCLOSURE

Field of the Invention

The present invention relates to an electromagnetic driving mechanism, and more particularly to an electromagnetic driving mechanism for moving an optical lens by electromagnetic force.

Description of the Related Art

Conventional photo cameras, video cameras, and mobile phones usually comprise an optical system for capturing images. The optical system may vibrate due to external impact and cause deviation of the optical path, causing the images captured by the optical system to be blurry. Taiwan patent No. 1457693 discloses a conventional optical image stabilization device. When the autofocus function is executed, a current is applied to the coil, and electromagnetic induction occurs between the coil and the magnet, so that the holder moves with respect to the base along the optical axis of the optical system. Two displacement sensors are disposed in the device to detect the position of the optical axis along the X and Y directions. When the optical axis deviates from the norm, electromagnetic induction can occur between the coils and the magnets, corresponding to the X and Y axes, so as to correct the position of the optical axis. However, owing to the miniaturization of the coils, the magnets, and the displacement sensors, the electromagnetic driving force and the displacement sensing accuracy can be reduced. Therefore, it is a challenge to achieve miniaturization of the electromagnetic mechanism without affecting performance.

BRIEF SUMMARY OF THE DISCLOSURE

Accordingly, one objective of the present invention is to provide a driving mechanism for driving an optical element. The driving mechanism includes a holder unit, a base unit, and a magnetic element. The holder unit is used to hold the optical element, and the base unit includes a metal substrate and a circuit structure formed on the metal substrate, wherein the circuit structure includes a driving coil. The magnetic element is disposed on the holder unit and corresponding to the driving coil for driving the optical element to move relative to the base unit.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it will be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1:
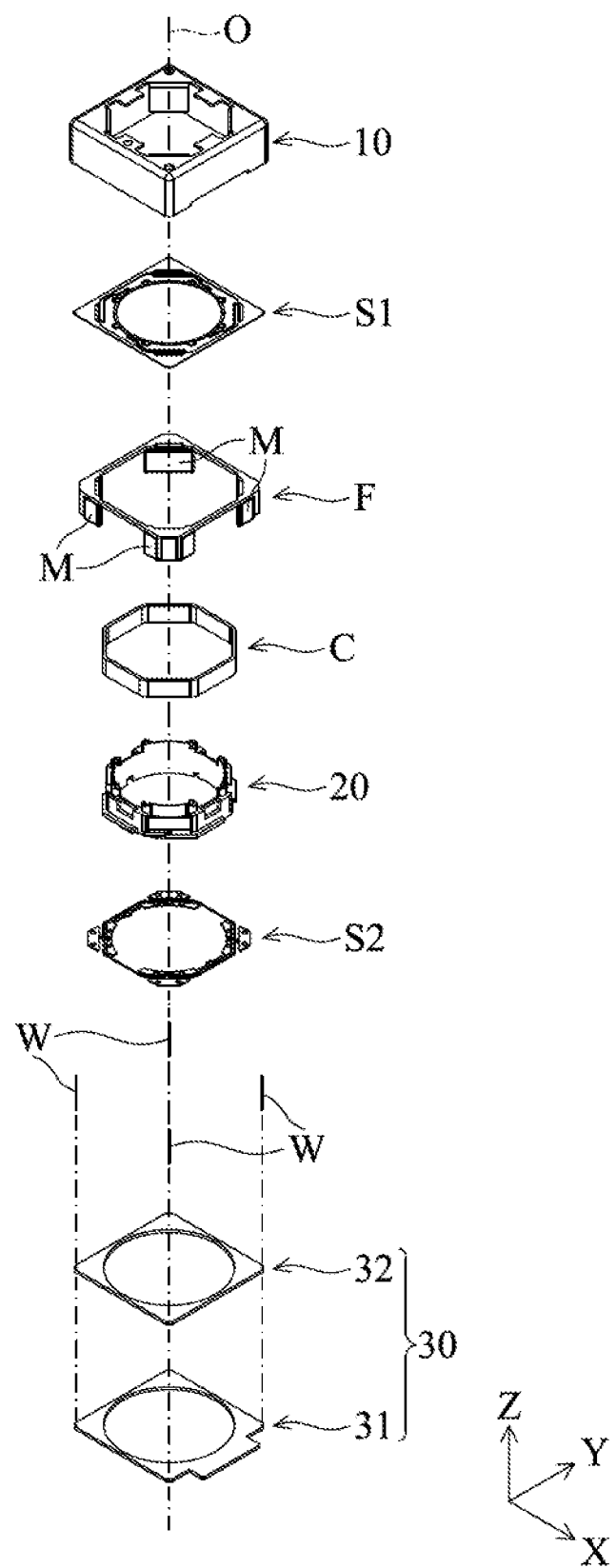
FIG. 1 shows an exploded diagram of a driving mechanism, in accordance with an embodiment of the invention.
Figure 2:
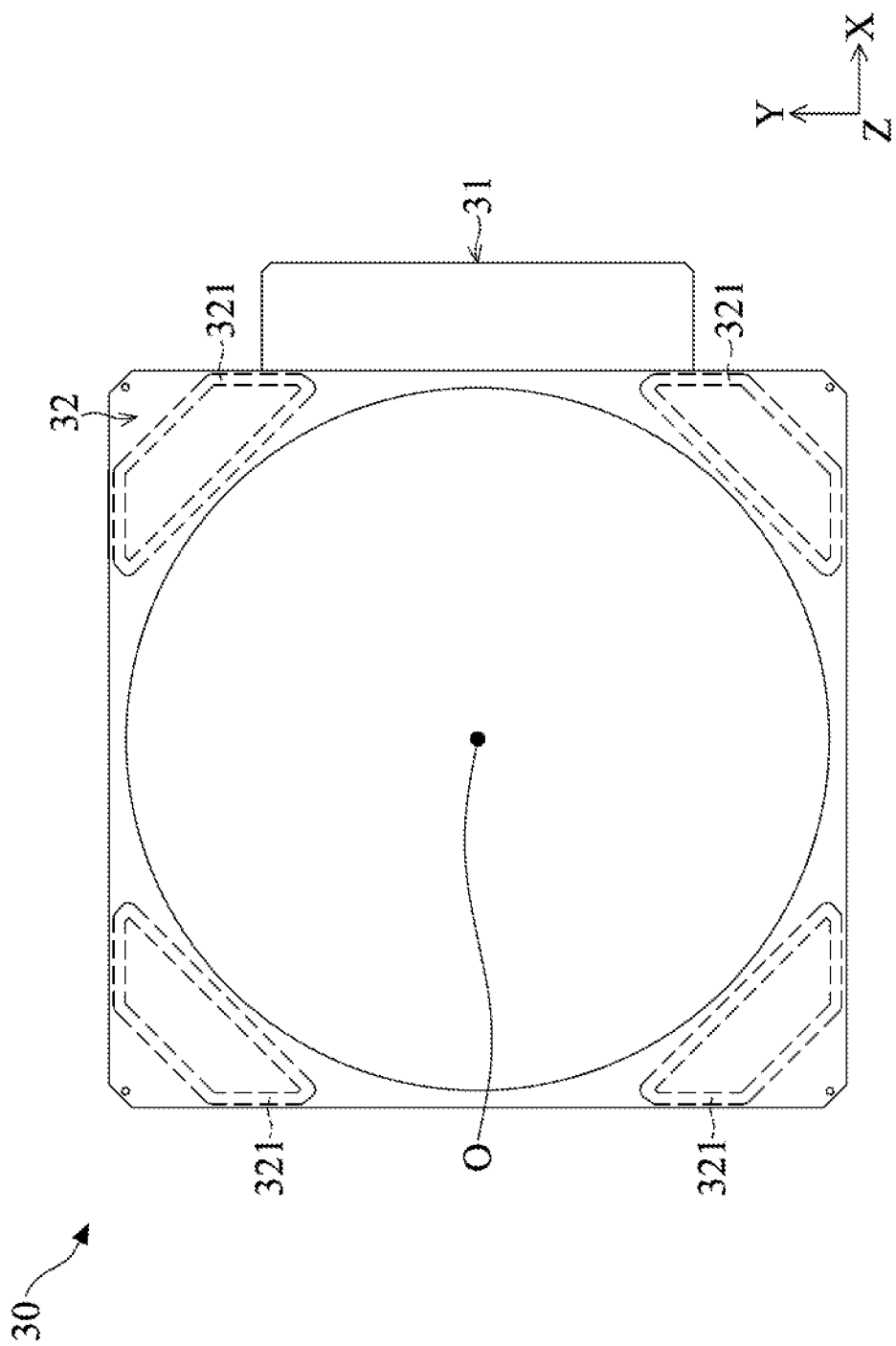
FIG. 2 shows a top view of the base unit 30 in FIG. 1 which comprises a metal substrate 31 and a circuit structure 32 when combined with each other.
Figure 3:
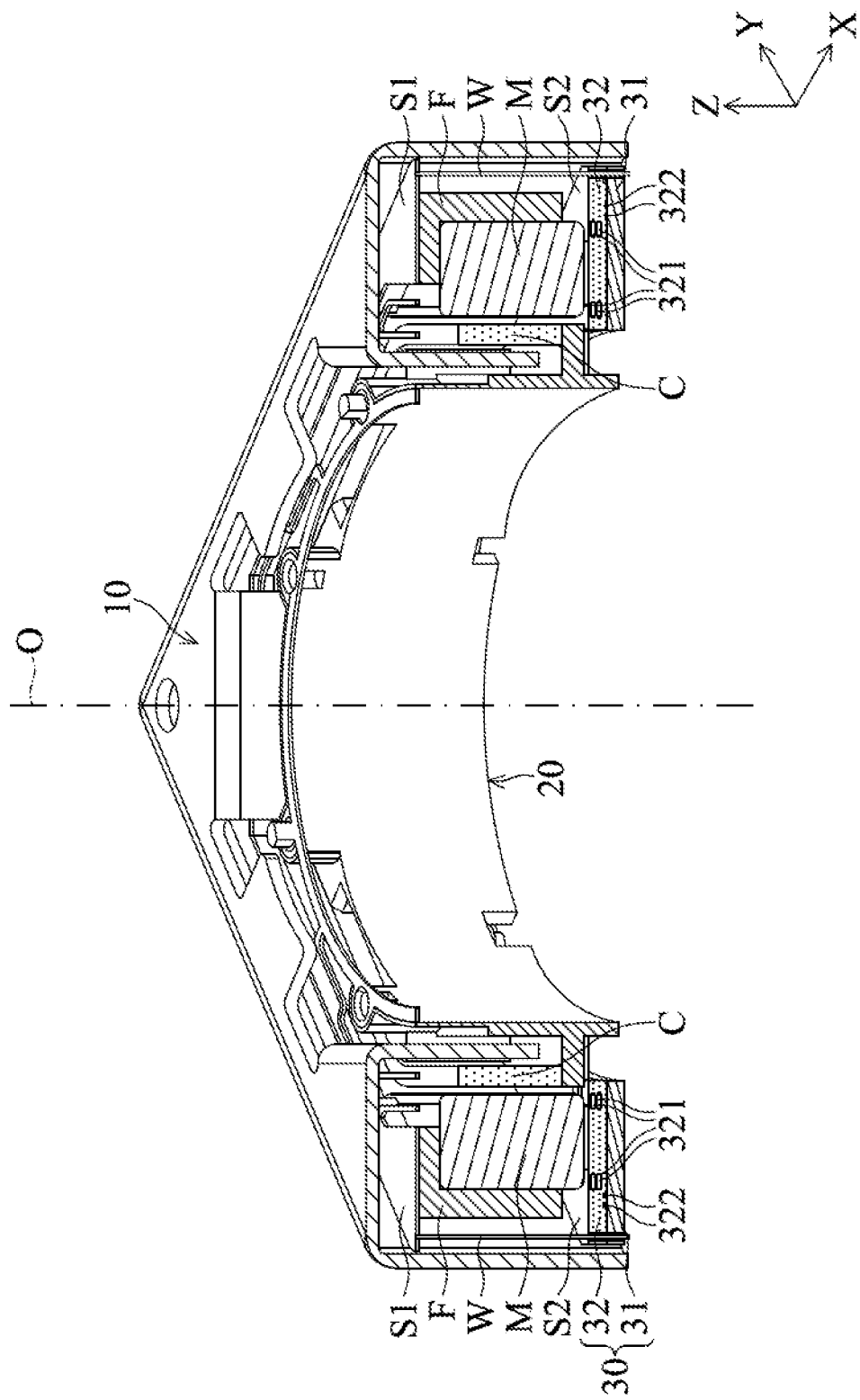
FIGS. 3-4 show cross-sectional views of the driving mechanism in FIG. 1 along a diagonal section line.
Figure 4:
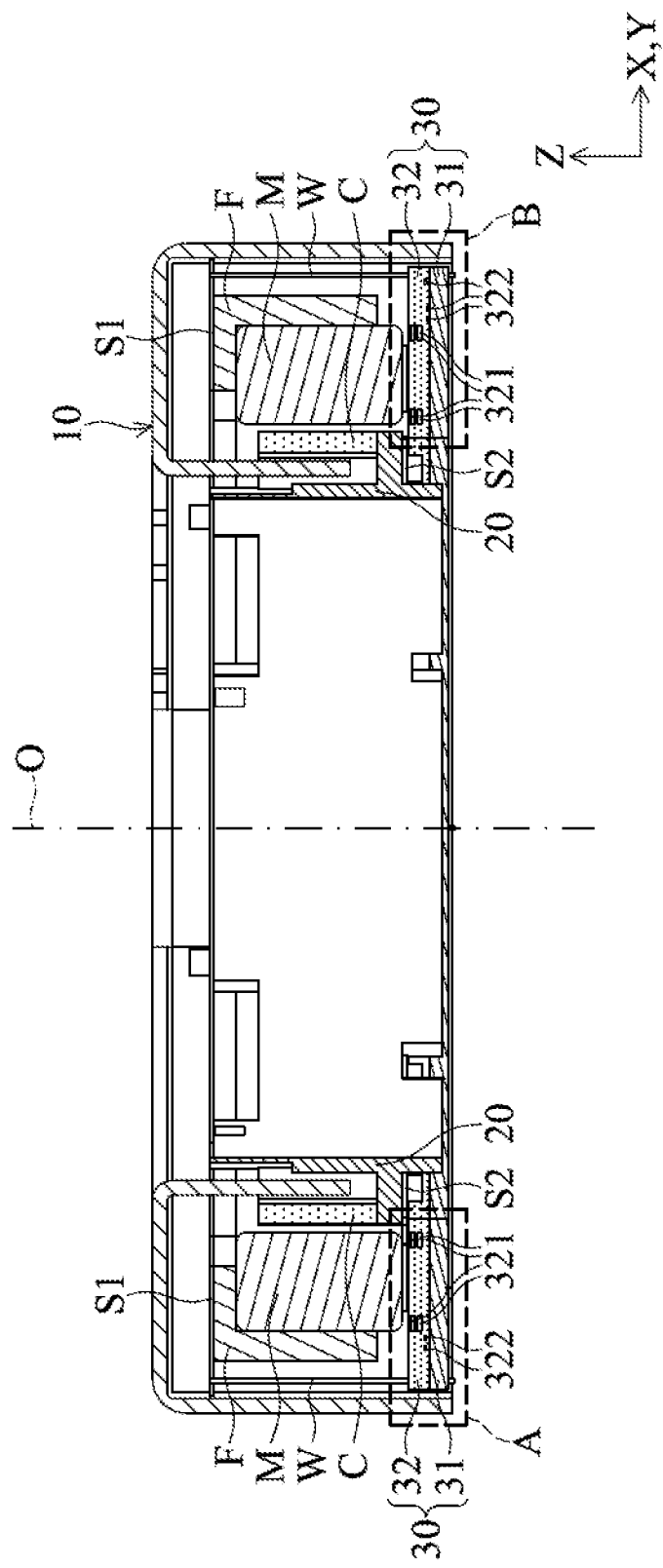

Referring to FIGS. 1-4, FIG. 1 shows an exploded diagram of a driving mechanism in accordance with an embodiment of the invention, FIG. 2 shows a top view of the base unit 30 in FIG. 1 which comprises a metal substrate 31 and a circuit structure 32, and FIGS. 3-4 show cross-sectional views of the driving mechanism in FIG. 1 along a diagonal section line. The driving mechanism in this embodiment is used for driving an optical element such as an optical lens (not shown). As shown in FIG. 1, the driving mechanism primarily comprises a housing 10, at least an upper spring S1, a frame F, at least a magnet M (or other magnetic element) fixed on the frame F, at least a driving coil C, a hollow holder 20, at least a lower spring S1, at least a resilient element W, and a base unit 30. The frame F and the holder 20 can constitute a holder unit for holding the optical element such as an optical lens.

In an exemplary embodiment, the driving mechanism may be disposed in a portable electronic device (such as cell phone or tablet computer), and the driving mechanism is electrically connected to an external circuit unit (not shown) through the base unit 30. The optical element can be disposed in the holder 20, and the position thereof is adjustable by electromagnetic force generated from the driving mechanism, so that light can enter the driving mechanism along an optical axis O (parallel to the Z axis) of the optical element and propagate through the optical element to a photosensitive element (not shown) for producing a clear image. For example, the driving mechanism may be a Voice Coil Motor (VCM).

Referring to FIGS. 1, 3, and 4, the driving coil C is disposed around the holder 20, the upper spring S1 connects the frame F with the holder 20, and the lower spring S2 connects the bottom of the magnet M with the holder 20, so that the holder 20 is movable relative to the frame F along a vertical direction (Z axis). Additionally, the resilient element W may be a metal stick extending along the Z axis and connecting the upper spring S1 with the base unit 30, so that the frame F, the holder 20 and the optical element received therein can move relative to the base unit 30 along a horizontal direction perpendicular to the Z axis.

In this embodiment, when a current is applied to the driving coil C, a magnetic force can be generated between the driving coil C and the magnet M. Thus, the holder 20 and the optical element received therein can be moved up or down relative to the frame F along the Z axis for autofocusing (AF).

Still referring to FIGS. 1-4, the base unit 30 comprises a metal substrate 31 and a circuit structure 32 formed on the metal substrate 31. At least a driving coil 321 is disposed in the circuit structure 32 and disposed in locations that correspond to the magnet M fixed to the frame F. Thus, the holder unit (including the frame F and the holder 20) and the optical element received therein can move along the horizontal direction (perpendicular to the Z axis) to facilitate the function of Optical Image Stabilization (OIS).

FIGS. 3 and 4 clearly show that the magnets M are fixed to the inner surface of the frame F, corresponding to the driving coil C on the holder 20 and the driving coils 321 embedded in the base unit 30, whereby the functions of autofocusing (AF) and Optical Image Stabilization (OIS) can be respectively performed. It should be noted that, besides the driving coil 321, at least a conductive trace 322 is also disposed in the circuit structure 32 of the base unit 30 to electrically connect the driving coil 321 with an external circuit unit outside the driving mechanism. Here, the circuit structure 32 may be integrally formed with the metal substrate 31 in one piece by insert molding or other manufacturing processes.

For example, a plastic material can be directly formed on the metal substrate 31 to encompass the driving coils 321 and the conductive traces 322 by insert molding, so that the circuit structure 32 can be directly produced on the metal substrate 31 to achieve low-cost production and miniaturization of the mechanism.

Figure 5:
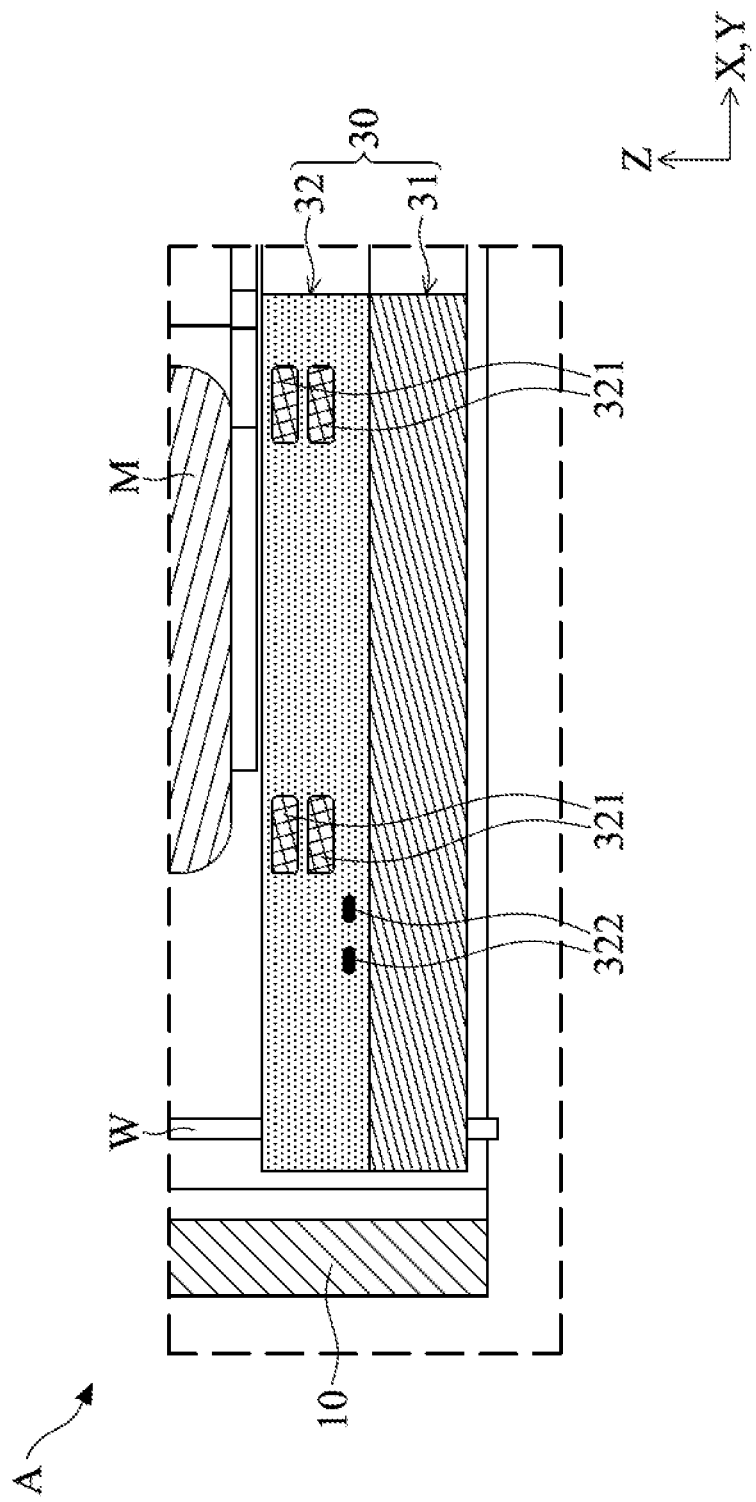
FIG. 5 shows an enlarged view of portion A in FIG. 4.
Figure 6:
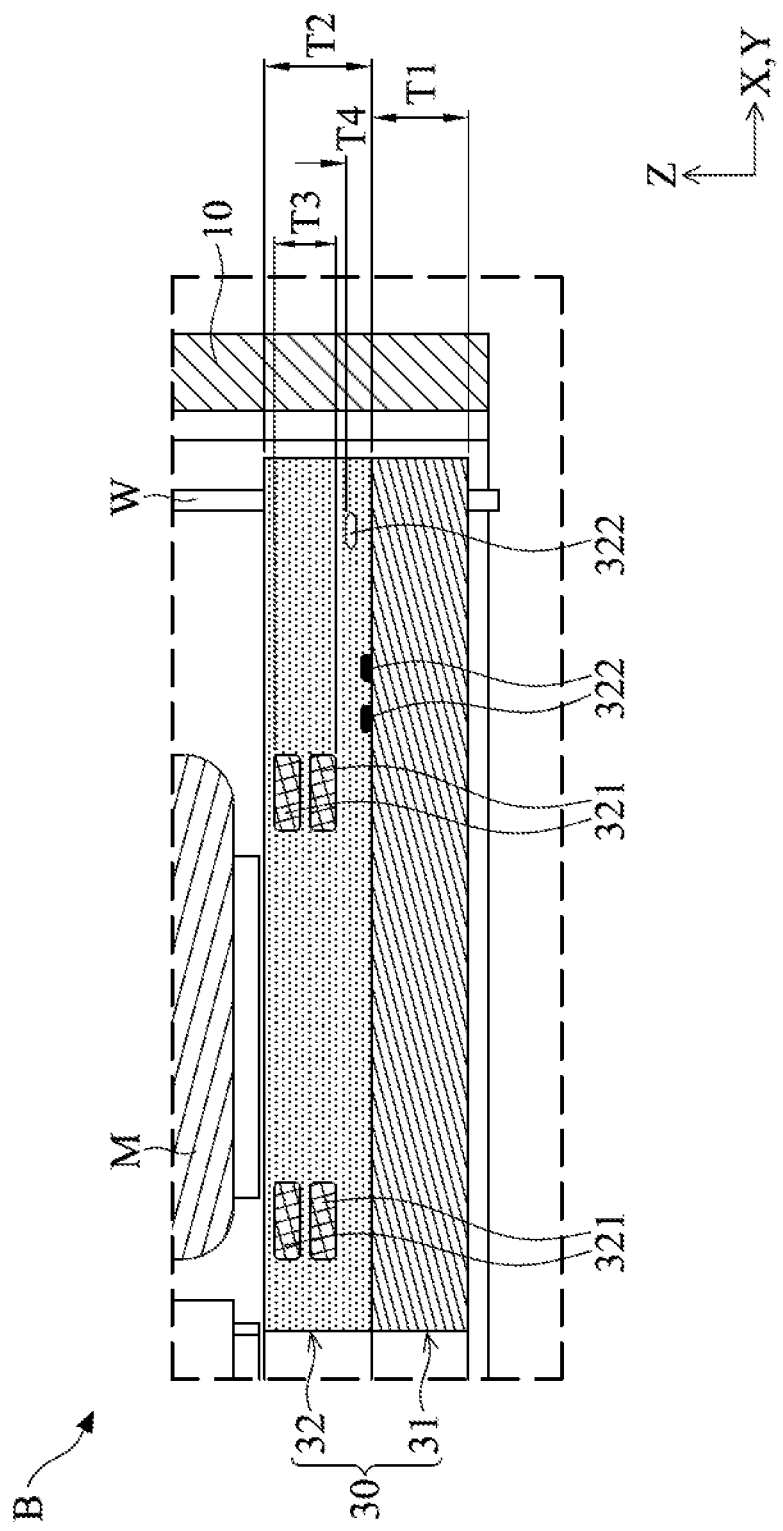
FIG. 6 shows an enlarged view of portion B in FIG. 4.

Referring to FIGS. 5 and 6, FIG. 5 shows an enlarged view of portion A in FIG. 4, and FIG. 6 shows an enlarged view of portion B in FIG. 4. As depicted in FIGS. 5 and 6, the driving coils 321 and the conductive traces 322 are embedded in an insulating material, wherein the driving coils 321 are disposed in locations that correspond to the magnet M thereabove, so as to generate a magnetic force moving the holder unit (including the frame F and the holder 20) and the optical element received therein along the horizontal direction (perpendicular to the Z axis).

It should be noted that both the driving coils 321 and the conductive traces 322 in this embodiment may have a multilayer structure, wherein the driving coils 321 are higher and closer to the magnet M than the conductive traces 322, and the driving coils 321 and the conductive traces 322 do not overlap when viewed along the X, Y, or Z axis. Additionally, FIG. 6 clearly shows that the metal substrate 31 has a first thickness T1 along the Z axis, and the circuit structure 32 has a second thickness T2 along the Z axis, wherein the first thickness T1 may be greater than the second thickness T2. However, in some embodiments, the second thickness T2 of the circuit structure 32 may also be greater than the first thickness T1 of the metal substrate 31, so that more layers of driving coils 321 and conductive traces 322 can be accommodated in the circuit structure 32.

As shown in FIG. 6, the driving coil 321 has a third thickness T3 along the Z axis, and the conductive traces 322 have a fourth thickness T4 along the Z axis, wherein the third thickness T3 is greater than the fourth thickness T4, and the first thickness T1 of the metal substrate 31 is greater than the third thickness T3 of the driving coil 321. It should be noted that some of the conductive traces 322 in FIG. 6 may be directly formed on and electrically connected to the metal substrate 31 for grounding and heat dissipation. FIGS. 5 and 6 also show that the driving coils 321 and/or the conductive traces 322 form at least a curved chamfer edge to prevent point discharge effect and short circuit caused by excessive short distance between the driving coils or the conductive traces.

Figure 7:
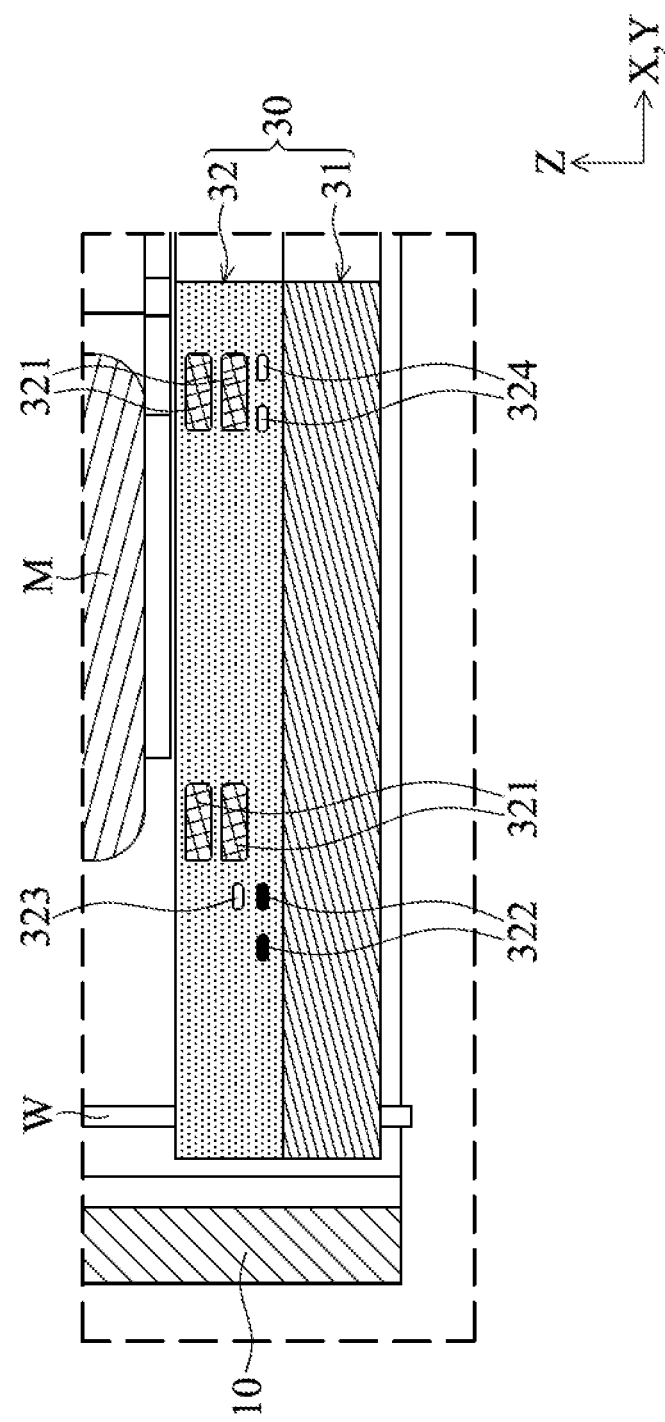
FIG. 7 shows a partial cross-sectional view of the base unit 30, in accordance with another embodiment of the invention.

FIG. 7 shows a partial cross-sectional view of the base unit 30 in accordance with another embodiment of the invention. In the circuit structure 32 of FIG. 7, the driving coil 321 and a conductive trace 323 may at least partially overlap along the horizontal direction (perpendicular to the Z axis). Additionally, the driving coil 321 and a conductive trace 324 may at least partially overlap along the vertical direction (Z axis). Thus, the dimensions of the base unit 30 in the horizontal or vertical direction can be further reduced for miniaturization of the mechanism.

Figure 8:
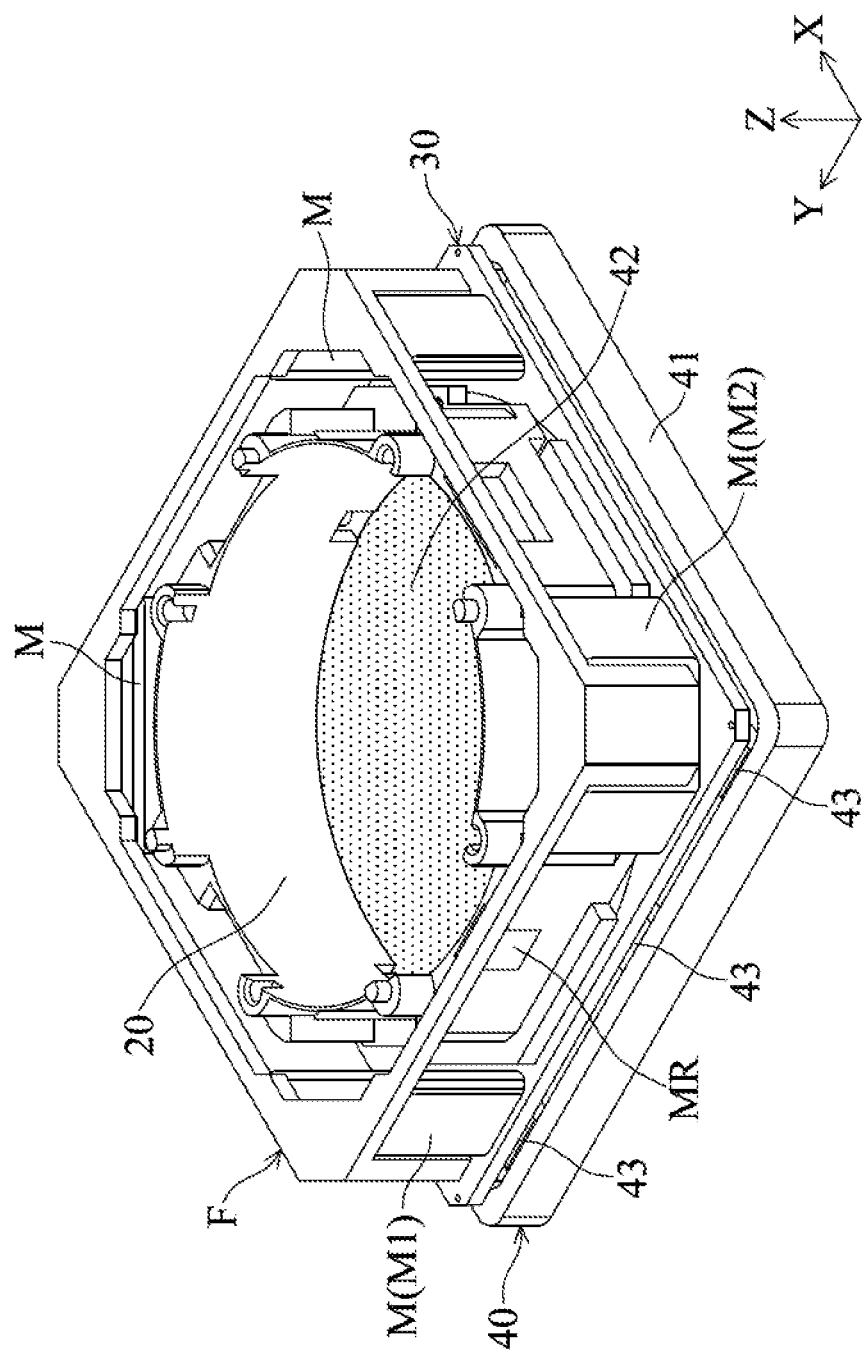
FIG. 8 shows a perspective diagram of a driving mechanism, in accordance with another embodiment of the invention.

FIG. 8 shows a perspective diagram of a driving mechanism in accordance with another embodiment of the invention. For convenient understanding, some components (such as housing 10, upper spring S1, and lower spring S2) of the driving mechanism are omitted from FIG. 8. In this embodiment, the driving mechanism further comprises a photosensitive module 40 disposed below the base unit 30. The photosensitive module 40 has a plate 41, a photosensitive element 42, and at least a magnetic field sensing element 43. The photosensitive element 42 is disposed at the center of the plate 41 and corresponds to the optical element received in the holder 20. The magnetic field sensing elements 43 are disposed on a side the plate 41 and disposed in locations that correspond to the magnets M(M1/M2) and/or a reference element MR (such as a sensing magnet or other magnetic element) fixed on the holder 20 for detecting the position of the frame F or the holder 20.

In an exemplary embodiment, the photosensitive element 42 may comprise a Charge Coupled Device (CCD) which receives the light entering the driving mechanism and propagating through the optical element to generate a digital image. Additionally, the magnetic field sensing elements 43 may comprise Anisotropic Magnetoresistance (AMR), Giant Magnetoresistance (GMR), or Tunnel Magnetoresistance (TMR) to detect the position of the magnets M(M1/M2)

and/or the reference element MR, thereby facilitating the functions of autofocusing (AF) and Optical Image Stabilization (OIS).

In this embodiment, the metal substrate 31 of the base unit 30 may be a stainless steel (SUS) substrate located between the magnetic field sensing elements 43 and the magnets M(M1/M2) and/or between the magnetic field sensing elements 43 and the reference element MR.

Since the metal substrate 31 can be made of stainless steel (SUS) material with thin profile, heat dissipation efficiency for the photosensitive module 40 can be enhanced without greatly reducing the sensing accuracy of the magnetic field sensing elements 43. Moreover, as the magnetic field sensing elements 43 are disposed on the photosensitive module 40 below the base unit 30, the space above the base unit 30 can be saved to facilitate miniaturization of the driving mechanism.

Figure 9:
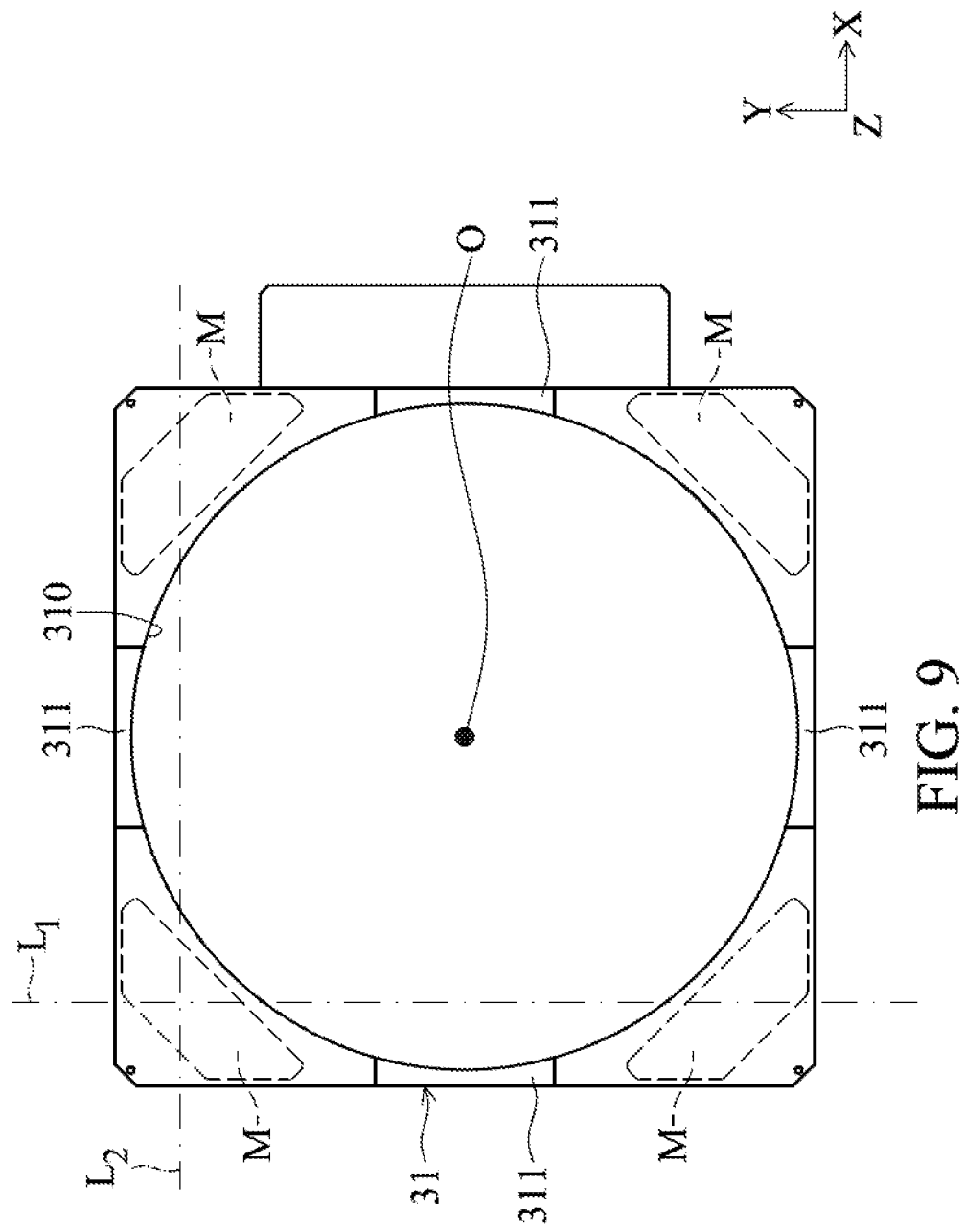
FIG. 9 shows the relative position of the metal substrate 31 and the magnets M, in accordance with another embodiment of the invention.
Figure 10:
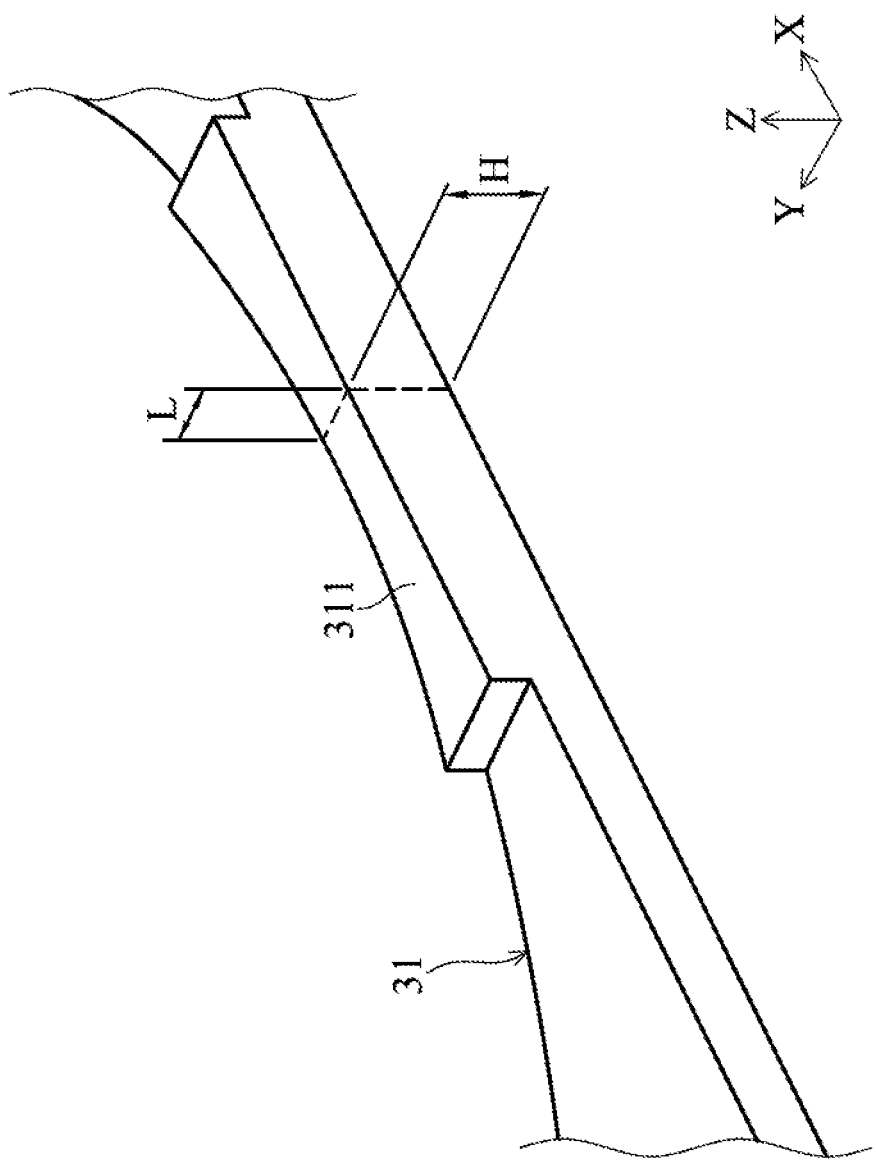
FIG. 10 shows a perspective diagram of the narrow portion 311 in FIG. 9.

Referring to FIGS. 9 and 10, FIG. 9 shows the relative position of the metal substrate 31 and the magnets M in accordance with another embodiment of the invention, and FIG. 10 shows a perspective diagram of the narrow portion 311 in FIG. 9. In this embodiment, as illustrated in FIGS. 9 and 10, four narrow portions 311 are formed on the four sides of the metal substrate 31. It should be noted that the strength of the narrow portion 311 is relatively weak due to the short width L thereof in the horizontal direction (perpendicular to the Z axis). For this reason, the thickness H of the narrow portion 311 in the vertical direction (Z axis) can be increased to improve the structural strength of the metal substrate 31. In an exemplary embodiment, the width L of the narrow portion 311 may be the minimum width of the metal substrate 31, and the thickness H of the narrow portion 311 may be increased to the maximum thickness of the metal substrate 31, wherein the thickness H may be greater than the width L of the narrow portion 311, enhancing the structural strength of the narrow portion 311.

FIG. 9 further clearly shows that the metal substrate 31 has a quadrilateral structure with a hole 310 formed thereon, and the magnets M are disposed in locations that correspond to the four corners of the metal substrate 31. Specifically, when viewed along the optical axis O (parallel to the Z axis), the lines L1 and L2 connecting the centers of the magnetic elements M pass through the hole 310.

Figure 11:
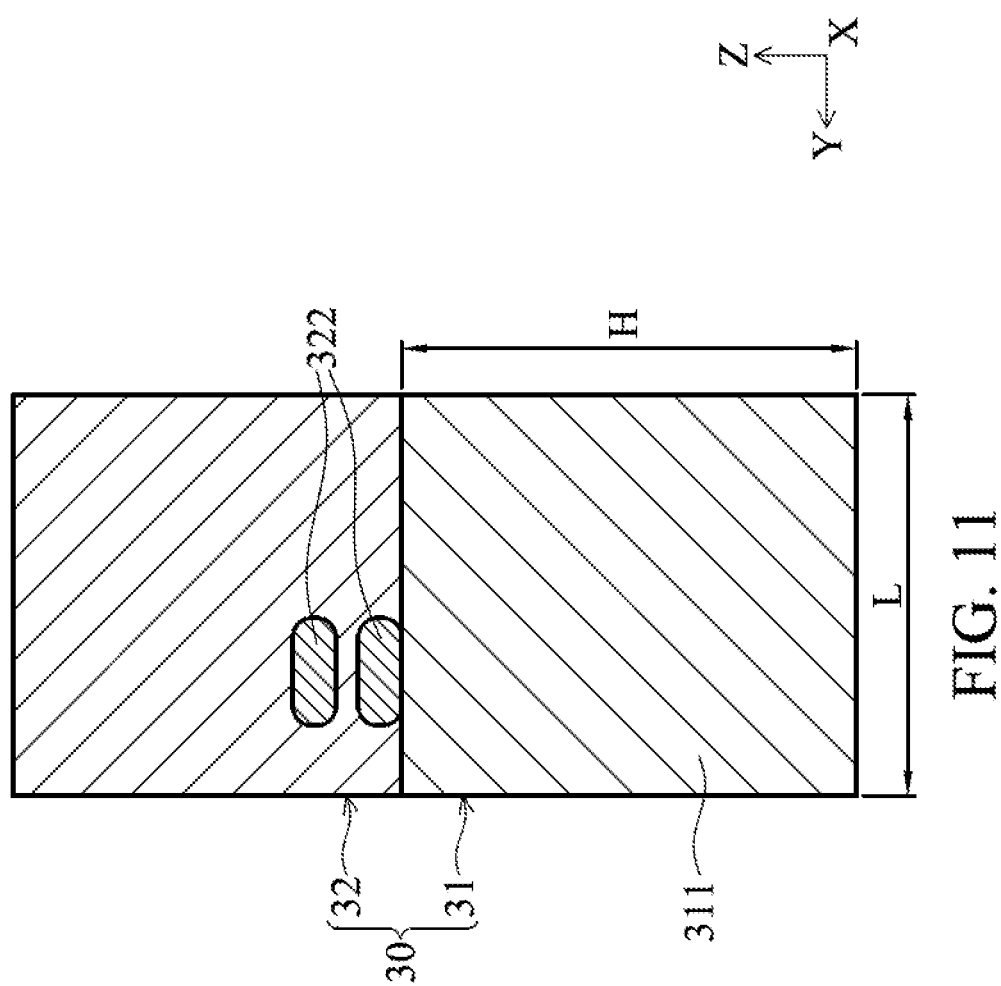
FIG. 11 shows the conductive traces 322 forming form a multilayer structure in the circuit structure 32 and above the narrow portion 311 of the metal substrate 31.

Referring to FIG. 11, since the narrow portion 311 of the metal substrate 31 has a relatively short width L, the conductive traces 322 embedded in the circuit structure 32 and located above the narrow portion 311 can be arranged along the Z axis to form a multilayer structure, thereby facilitating efficient space utilization of the circuit structure 32 and achieving miniaturization of the driving mechanism.

Figure 12:
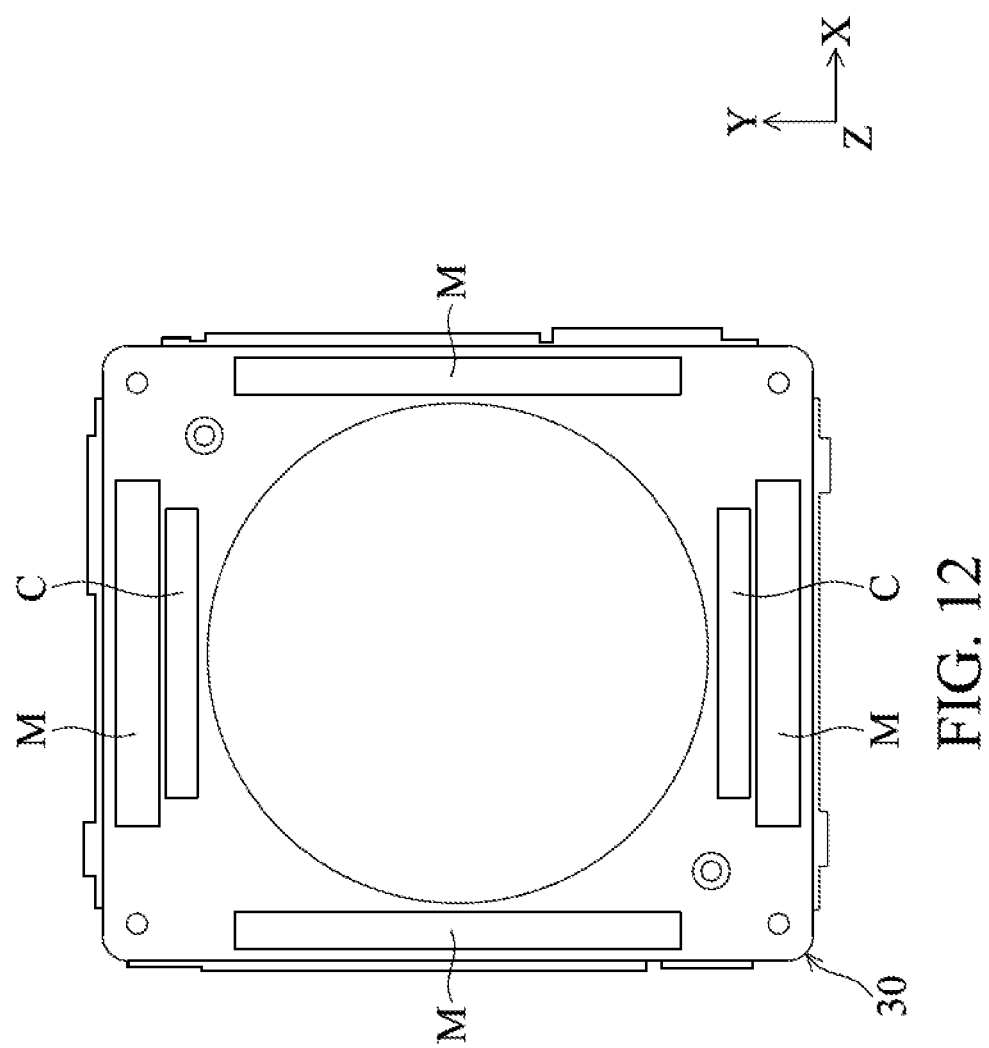
FIG. 12 shows the relative position of the base unit 30, the magnets M and the driving coils C, in accordance with another embodiment of the invention.

As depicted in FIG. 12, in another embodiment, the magnets M may be multipolar magnets and disposed in locations that correspond to the driving coils 321 embedded on four sides of the base unit 30. Moreover, two driving coils C are disposed on the outer sides of the holder 20 (not shown), corresponding to two of the magnets M. Thus, when a current is applied to the driving coils C, the holder 20 and the optical element received therein can be moved up or down along the Z axis for autofocusing (AF).

Figure 13:
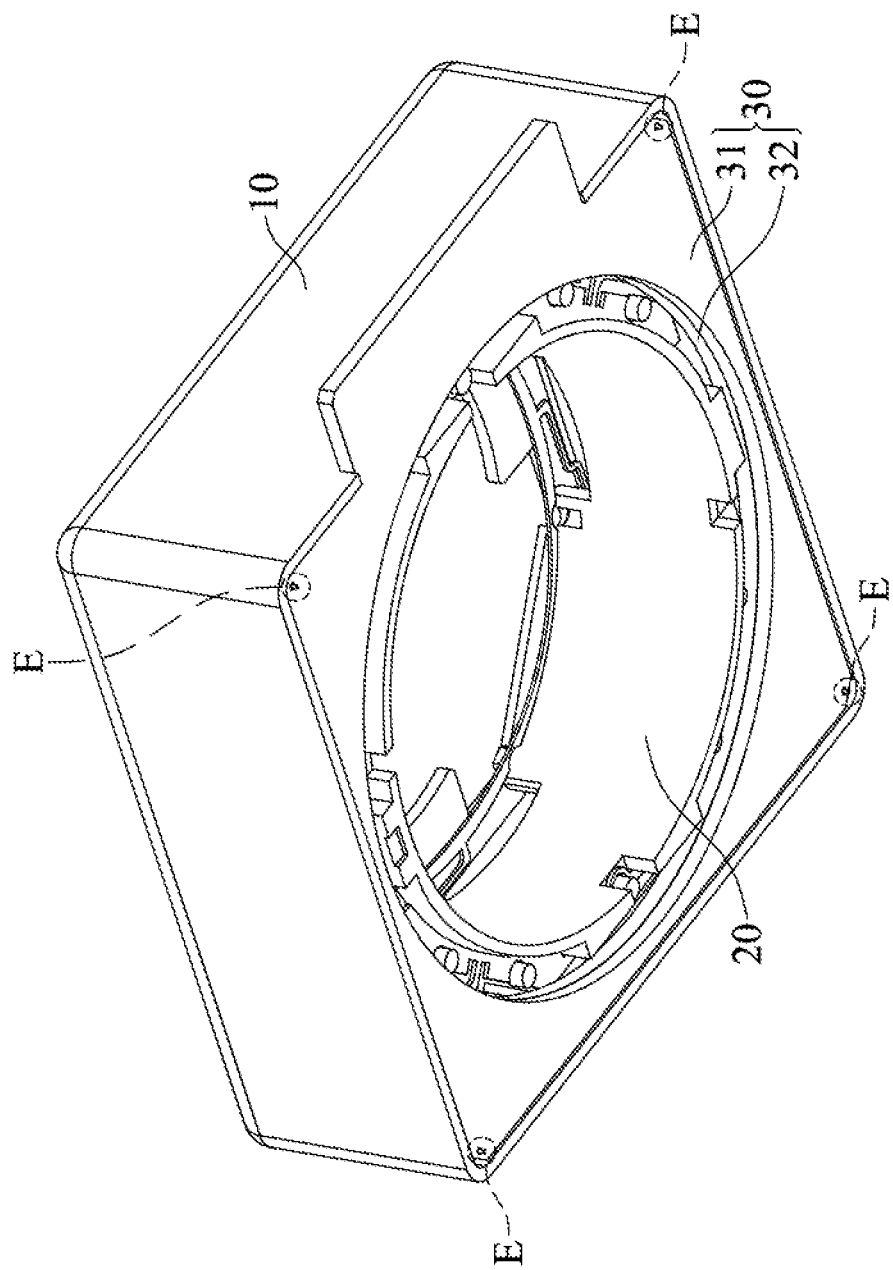
FIG. 13 shows a perspective diagram of a driving mechanism after assembly, in accordance with an embodiment of the invention.

FIG. 13 shows a perspective diagram of a driving mechanism after assembly, in accordance with an embodiment of the invention, wherein the housing 10 may comprise metal, and the metal substrate 31 of the base unit 30 may be firmly fixed to the housing 10 by soldering, welding, or an adhesive. In this embodiment, the metal substrate 31 and the housing 10 are connected to each other by laser welding at the four corners of the metal substrate 31 (as the four areas E indicate in FIG. 13), thereby achieving efficient space utilization and miniaturization of the driving mechanism.

In some embodiments, the housing 10 may be welded to the four sides of the metal substrate 31, thus enhancing the connection strength therebetween. In some embodiments, an annular welding between the housing 10 and the quadrilateral metal substrate 31 may be performed (such as by soldering, welding, or an adhesive) to form an annular seal, thus preventing the external particles from intruding into the driving mechanism and facilitating electrical grounding of the housing 10 and the metal substrate 31.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving mechanism for driving an optical element, comprising:
   a housing, having a top cover, a sidewall extending from the top cover along an optical axis of the optical element, and a receiving space, wherein the top cover is not parallel to the optical axis;
   a base unit, disposed in the receiving space, comprising:
      a metal substrate; and
      a circuit structure, directly formed on the metal substrate, wherein the circuit structure comprises a driving coil;
   a holder unit, disposed between the housing and the base unit and configured to hold the optical element;
   a magnetic element, disposed in the receiving space and corresponding to the driving coil for driving the optical element to move relative to the base unit; and
   a photosensitive module, having a photosensitive element corresponding to the optical element and a magnetic field sensing element corresponding to the magnetic element;
   wherein the base unit is disposed between the magnetic element and the magnetic field sensing element;
   wherein the metal substrate has a first thickness along the optical axis of the optical element, the circuit structure has a second thickness along the optical axis, and the second thickness is greater than the first thickness.

2. The driving mechanism as claimed in claim 1, wherein the driving coil has a third thickness along the optical axis, and the circuit structure comprises a conductive trace having a fourth thickness along the optical axis, wherein the first thickness is greater than the third thickness, and the third thickness is greater than the fourth thickness.

3. The driving mechanism as claimed in claim 1, wherein the circuit structure further comprises a conductive trace electrically connected to the driving coil, and the driving coil and the conductive trace at least partially overlap when viewed along the optical axis of the optical element.

4. The driving mechanism as claimed in claim 1, wherein the circuit structure further comprises a conductive trace electrically connected to the driving coil, and the driving coil and the conductive trace at least partially overlap when viewed along a horizontal direction perpendicular to the optical axis of the optical element.

5. The driving mechanism as claimed in claim 1, wherein the circuit structure further comprises a conductive trace electrically connected to the driving coil, and the driving coil or the conductive trace forms a chamfer edge.

6. The driving mechanism as claimed in claim 1, wherein the circuit structure further comprises a conductive trace formed on the metal substrate.

7. The driving mechanism as claimed in claim 1, wherein the circuit structure further comprises a conductive trace electrically connected to the metal substrate.

8. The driving mechanism as claimed in claim 1, wherein the metal substrate comprises stainless steel.

9. The driving mechanism as claimed in claim 1, wherein the metal substrate is situated at the very bottom of the base unit.

10. The driving mechanism as claimed in claim 1, wherein the photosensitive module further comprises a plate, and the magnetic field sensing element and the photosensitive element are disposed on the plate.

11. The driving mechanism as claimed in claim 1, further comprising a plurality of magnetic elements, wherein the circuit structure further comprises a plurality of driving coils corresponding to the magnetic elements, the metal substrate has a quadrilateral structure, and the magnetic elements are disposed on different sides of the quadrilateral structure.

12. The driving mechanism as claimed in claim 1, wherein the housing is fixed to the metal substrate by soldering, welding, or an adhesive.

13. The driving mechanism as claimed in claim 1, wherein the metal substrate forms a quadrilateral structure, and the housing is welded to the four corners of the metal substrate by laser welding.

14. A driving mechanism for driving an optical element, comprising:
a housing, having a top cover, a sidewall extending from the top cover along an optical axis of the optical element, and a receiving space, wherein the top cover is not parallel to the optical axis;
a base unit, disposed in the receiving space, comprising:
a metal substrate; and
a circuit structure, directly formed on the metal substrate, wherein the circuit structure comprises a driving coil;
a holder unit, disposed between the housing and the base unit and configured to hold the optical element;
a magnetic element, disposed in the receiving space and corresponding to the driving coil for driving the optical element to move relative to the base unit; and
a photosensitive module, having a photosensitive element corresponding to the optical element and a magnetic field sensing element corresponding to the magnetic element;
wherein the base unit is disposed between the magnetic element and the magnetic field sensing element;
wherein the metal substrate has a maximum thickness along the optical axis of the optical element and a minimum width along a direction perpendicular to the optical axis, wherein the maximum thickness is greater than the minimum width.

15. The driving mechanism as claimed in claim 14, further comprising a plurality of magnetic elements, wherein the circuit structure further comprises a plurality of driving coils that correspond to the magnetic elements, and the metal substrate has a quadrilateral structure and a hole, wherein when viewed along the optical axis of the optical element, the lines connecting the centers of the magnetic elements pass through the hole.

16. The driving mechanism as claimed in claim 14, wherein the circuit structure further comprises a conductive trace formed on the metal substrate.

17. A driving mechanism for driving an optical element, comprising:
a housing, having a top cover, a sidewall extending from the top cover along an optical axis of the optical element, and a receiving space, wherein the top cover is not parallel to the optical axis;
a base unit, disposed in the receiving space, comprising:
a metal substrate; and
a circuit structure, directly formed on the metal substrate, wherein the circuit structure comprises a driving coil;
a holder unit, disposed between the housing and the base unit and configured to hold the optical element;
a magnetic element, disposed in the receiving space and corresponding to the driving coil for driving the optical element to move relative to the base unit; and
a photosensitive module, having a photosensitive element corresponding to the optical element and a magnetic field sensing element corresponding to the magnetic element;
wherein the base unit is disposed between the magnetic element and the magnetic field sensing element;
wherein the metal substrate has a narrow portion having a thickness along the optical axis of the optical element and a width along a direction perpendicular to the optical axis, wherein the thickness is greater than the width.

18. The driving mechanism as claimed in claim 17, wherein the circuit structure further comprises a conductive trace formed on the metal substrate.

19. A driving mechanism for driving an optical element, comprising:
a housing, having a top cover, a sidewall extending from the top cover along an optical axis of the optical element, and a receiving space, wherein the top cover is not parallel to the optical axis;
a base unit, disposed in the receiving space, comprising:
a metal substrate; and
a circuit structure, directly formed on the metal substrate, wherein the circuit structure comprises a driving coil;
a holder unit, disposed between the housing and the base unit and configured to hold the optical element;
a magnetic element, disposed in the receiving space and corresponding to the driving coil for driving the optical element to move relative to the base unit; and
a photosensitive module, having a photosensitive element corresponding to the optical element and a magnetic field sensing element corresponding to the magnetic element;
wherein the base unit is disposed between the magnetic element and the magnetic field sensing element;
wherein the metal substrate has a narrow portion, and the circuit structure further comprises a conductive trace, wherein the narrow portion has a minimum width of the metal substrate along a direction perpendicular to the optical axis of the optical element, and the conductive trace forms a multilayer structure above the narrow portion.

20. A driving mechanism for driving an optical element with an optical axis, comprising:
a holder unit, configured to hold the optical element;
a base unit, comprising:
a metal substrate; and a circuit structure, directly formed on the metal substrate without adhesives between the metal substrate and the circuit structure, wherein the circuit structure comprises:
   a driving coil; and
   a conductive trace, electrically connected to the driving coil, wherein a maximum size of the conductive trace in the optical axis is less than a maximum size of the metal substrate in the optical axis; and a housing, has a top cover and a sidewall extending from the top cover toward the base unit, wherein the top cover is not parallel to the optical axis; and a magnetic element, disposed on the holder unit and corresponding to the driving coil for driving the optical element to move relative to the base unit.

\* \* \* \* \*